United States Patent
Seals et al.

(10) Patent No.: US 6,844,875 B2
(45) Date of Patent: Jan. 18, 2005

(54) VIDEO CONVERTER BOARD

(75) Inventors: James M. Seals, Loogootee, IN (US); Richard W. Williams, Loogootee, IN (US); Joseph H. Quinn, Loogootee, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 764 days.

(21) Appl. No.: 09/898,360

(22) Filed: Jul. 3, 2001

(65) Prior Publication Data

US 2003/0025831 A1 Feb. 6, 2003

Related U.S. Application Data (60) Provisional application No. 60/281,423, filed on Apr. 3, 2001.

(51) Int. Cl.[7] .................................................. G09G 5/00
(52) U.S. Cl. ...................... 345/213; 348/441; 345/3.1
(58) Field of Search .............................. 345/204–215, 345/3.1; 348/441, 442, 521–524

(56) References Cited

U.S. PATENT DOCUMENTS

| | | | |
|---|---|---|---|
| 4,148,070 A | 4/1979 | Taylor .......................... 358/160 |
| 4,485,402 A | 11/1984 | Searby ......................... 358/160 |
| 4,740,833 A | 4/1988 | Shiota et al. .................. 358/80 |
| 4,780,756 A | 10/1988 | Shiota et al. .................. 358/78 |
| 4,786,893 A | 11/1988 | Moore .......................... 340/703 |
| 5,229,853 A | 7/1993 | Myers .......................... 358/140 |
| 5,349,385 A | 9/1994 | Glenn .......................... 348/458 |
| 5,410,357 A | 4/1995 | Rieger et al. .................. 348/458 |
| 5,506,604 A | 4/1996 | Nally et al. ................... 345/154 |
| 5,557,297 A * | 9/1996 | Sharp et al. ................... 345/614 |
| 5,742,350 A | 4/1998 | Pan et al. ..................... 348/458 |
| 5,752,032 A | 5/1998 | Keller et al. .................. 395/681 |
| 5,754,244 A | 5/1998 | Kahlman ....................... 348/448 |
| 5,872,556 A | 2/1999 | Rackley et al. ............... 345/154 |
| 5,900,917 A | 5/1999 | Yanai et al. ................... 348/584 |
| 5,910,180 A | 6/1999 | Flory et al. ................... 709/301 |
| 5,973,746 A | 10/1999 | Nakamoto et al. ............ 348/458 |
| 6,049,360 A | 4/2000 | Yanai et al. ................... 348/584 |
| 6,064,443 A * | 5/2000 | Lee ............................. 348/530 |
| 6,130,660 A | 10/2000 | Imsand ......................... 345/132 |
| 6,496,160 B1 * | 12/2002 | Tanner et al. ................. 345/3.1 |

* cited by examiner

*Primary Examiner*—Alexander Eisen
(74) *Attorney, Agent, or Firm*—James B. Bechtel, Esq.; Matthew J. Bussan, Esq.; Scott R. Boalick, Esq.

(57) ABSTRACT

Disclosed is a video converter board that converts stroke/raster video data generated by one display subsystem into a video format responsive to a sync-on-green (SOG) control signal and utilized by another display subsystem.

6 Claims, 6 Drawing Sheets

VIDEO CONVERTER BOARD

CROSS-REFERENCE TO RELATED APPLICATIONS

This is a utility Patent Application based upon the Provisional Application Ser. No. 60/281,423 filed Aug. 3, 2001.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1.0 Field of the Invention

The present invention relates to converters and, more particularly, to a video converter board for converting stroke/raster video data into a Red, Green, Blue (RGB) video data formatted to meet various protocol requirements for a serial

2.0 Description of the Related Art

Display systems display text and graphic information rendered as a picture on a video screen in a response to a particular format of control signals or control data. For example, a stroke/raster video format has been commonly used to render a video image on a display system, such as those finding wide applications in the field of sonar and radar display systems found in both commercial and military applications. Recent improvements to display systems have commonly utilized a format different than the stroke/raster format such as that of a Red, Green, Blue (RGB) video format with the signals thereof transfer by way of a serial interface conforming to Electronic Industries Association (EIA) standards.

In certain environments, it is desired that the same video data be used to render a visual image on display systems having different video formats. For example, a first display system generates a stroke/raster video, whereas a second display system uses and generates a Red, Green, Blue (RGB) video. The RGB format includes a signal called "sync-on-green" (SOG) which is the green portion of the RGB video format and also contains the timing signals known as the "sync" signal. In this example, both the first and second display systems perform the same function. timing signals known as the "sync" signal. In this example, both the first and second display systems perform the same function. If one wishes to display data from both the first and second display systems on a remote monitor that uses RGB video, then a converter is required to convert the stroke/raster video from the first display system into RGB video. Accordingly, it is desired that a video converter board be provided for converting stroke/raster video data format into a Red, Green, Blue (RGB) video.

OBJECTS OF THE INVENTION

It is a primary objective of the present invention to provide a video converter board for converting stroke/raster video data into RGB video so as to accommodate the usage of a remote monitor that uses RGB video.

It is a further objective of the present invention to provide for a video converter board for converting stroke/raster video formatted data into a RGB format for its utilization with a serial interface conforming to a RS-343A standard.

SUMMARY OF THE INVENTION

This invention is directed to a video converter board for converting stroke/raster video data into RGB video responsive to a control signal sync-on-green (SOG) so that the data making up a video image may be utilized by a display subsystem having a communication channel comprising a serial interface conforming to EIA standards.

The video converter board comprises an analog/digital front-end circuitry, video memory, memory control circuitry, synchronization control circuitry, and a digital-to-analog converter output circuitry. The analog/digital front-end circuitry receives and samples X deflection, Y deflection, or Video input data transmitted in a stroke/raster video format. The analog/digital front-end circuitry converts each of the received signals into a corresponding digital quantity. The memory is comprised of a plurality of banks for storing each digital quantity, and the memory control circuitry sequentially selects each of the plurality of memory banks. The synchronization control circuitry has a first routine for generating the sync-on-green (SOG) signal and a second routine for generating the memory addresses for reading and blanking the selected memory. The digital/analog converter output circuitry receives, in response to the synchronization control circuitry, the formatted RGB video data, as well as the SOG signal, and interlaces and outputs the SOG signal, along with the RGB video data, in a manner conforming to the requirements of the RS-343A interface.

BRIEF DESCRIPTION OF THE DRAWINGS

A better understanding of the present invention may be realized when considered in view of the following detailed description, taken in conjunction with the accompanying drawings wherein.

DETAILED DESCRIPTION OF THE PREFERRED EMBODIMENTS

Figure 1:
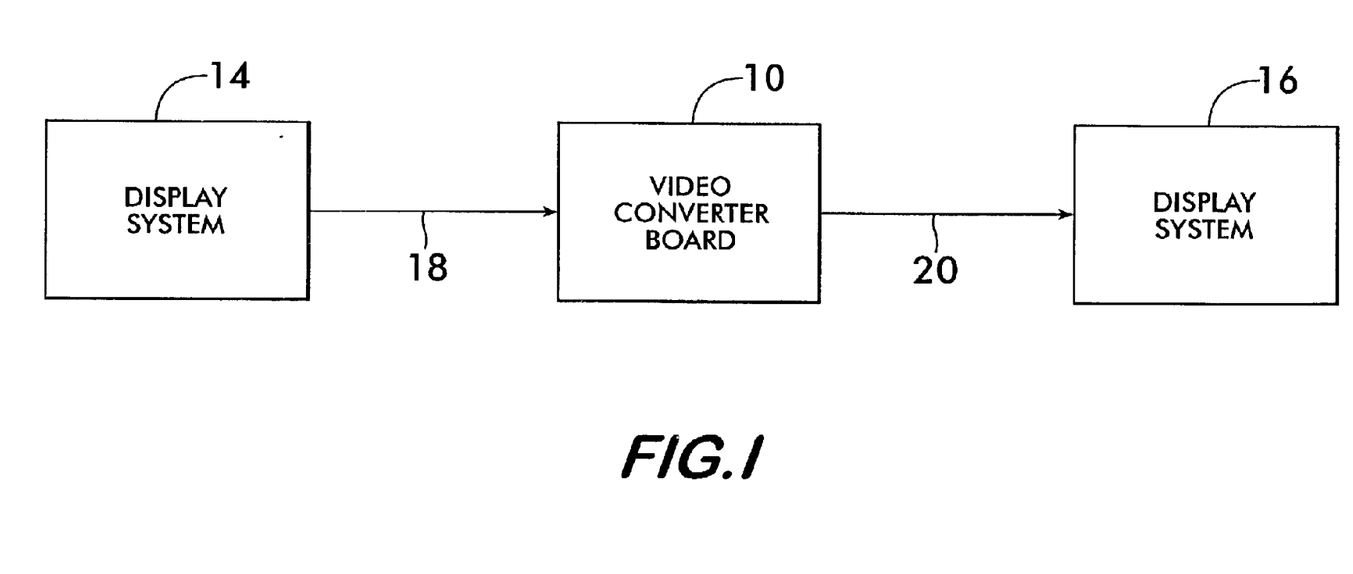
FIG. 1 is a block diagram showing the video converter board of the present invention interposed between display subsystems and converting the stroke/raster video format data generated by one display subsystem into the RGB video format data utilized by the other display system.

Referring to the drawings wherein the same reference number indicates the same element throughout, there is shown in FIG. 1 a block diagram, wherein the video converter board 10 of the present invention is interposed between a first subsystem 14 and a second system 16 and allows the first display system 14 to transfer signals to the second display system 16 which may be a remote monitor or flat panel. The display system 14 provides an output comprised of stroke/raster video data on signal path 18 which is actually comprised of three lines respectively carrying X deflection (X Def), Y deflection (Y Def), and Video signals, whereas the video converter board 10 converts the information embodied in the stroke/raster video on signal path 18 into a RGB video data format. More particularly, the video converter board 10 reformats the information carried by the raster/stroke transmission scheme into a RGB video data format responsive to a sync-on-green signal. Specifically, the video converter board 10 reformats its received information and provides output data in the RGB video data format so that it may be received and presented by the display system 16 requiring a serial interface on signal path 20 conforming to an Electronic Industry Association (EIA) standard, such as, a serial interface formatted in accordance with RS-343A standard. To our understanding, the RS-343A is the only standard that supports RGB video, but it is contemplated that the present invention will be applicable to other standards if such exist that support RGB video. In general, the display system 14 generates stroke/raster video only. The video converter board 10 converts the stroke/raster video into RGB so that the display subsystem 16 that uses RGB video will accept and display the video information generated by the display system 14. In one of its embodiments, the video converter board 10 generates monochrome video only i.e., the video converter boar 10 generates green video on a black background, wherein Red and Blue colors are not used. However, the video converter board 10 provides the functions to satisfy the requirements of the RGB format, sometimes referred to as SOG video. The operation of the video converter board 10 may be further described with reference to FIG. 2 composed of FIGS. 2(A), 2(B), and 2(C).

FIG. 2 illustrates a block diagram of a video converter board 10 which contains seven major sections or subsystems: (1) A/D front end circuitry 22, (2) video memory 24, (3) memory control circuitry 26, (4) D/A output circuitry 28, (5) SOG circuitry 30, (6) a timing subsystem 32, and (7) a power subsystem 34. The seven major sections 22, 24, 26, 28, 30, 32, and 34 are arranged as shown in FIG. 2. Each of the seven major subsystems 22, 24, 26, 28, 30, 32, and 34, as shown in FIG. 2, is made up of elements generally identified by their associated reference number and also carrying a letter nomenclature. For example, the A/D front-end circuitry 22 is made up, as shown in FIG. 2, of elements 22A, 22B, 22C, 22D, 22E, 22F, 22G, 22H, and 22I.

The signal path 20, is preferably a serial interface conforming to RS-343A standard more fully described in Electronic Industries Association, Electrical Performance Standards for High Resolution Monochrome Closed Circuit Television Camera. (EIA Standard: RS-343A) Washington, The Association, 1967. The video converter board 10 uses a standard open architecture, such as Versa Modula Europo (VME) defined by the VITA (VMEbus International Trade Association). The size of video converter board 10 is defined by VME. The connector power and ground pins of the video converter board are also defined by VME. There is no data transferred from the video converter board 10 onto VME bus. All input and output data going to and from the video converter board 10 are sent through BNC type connectors on the front panel of the video converter board 10. In one embodiment, there are three (3) BNCs for the input signals and one (1) BNC for the output signal of the video converter board 10. The elements shown on FIG. 2 are tabulated on Table 1 below.

TABLE 1

| ELEMENT | NOMENCLATURE |
|---------|--------------|
| 22A | Gain and Offset (G&O) Device |
| 22B | Gain and Offset (G&O) Device |
| 22C | Gain and Offset (G&O) Device |
| 22D | A/D 40 MHz |
| 22E | A/D 40 MHz |
| 22F | A/D 40 MHz |

TABLE 1-continued

| ELEMENT | NOMENCLATURE |
|---------|--------------|
| 22G | Programmable Array Logic (PAL) Latch |
| 22H | Programmable Array Logic (PAL) Latch |
| 22I | Programmable Array Logic (PAL) Latch |
| 24A | Address Buffer Zero (0) (AB0) |
| 24B | Address Buffer One (1) (AB1) |
| 24C | Address Buffer Two (2) (AB2) |
| 24D | Data Buffer Zero (0) (DB0) |
| 24E | Data Buffer One (1) (DB1) |
| 24F | Data Buffer Two (2) (DB2) |
| 24G | Blank Data Buffer Zero (0) (BDB0) |
| 24H | Blank Data Buffer One (1) (BDB1) |
| 24I | Blank Data Buffer Two (2) (BDB2) |
| 24J | 1MX8 M0 80 MHZ |
| 24K | 1MX8 M1 80 MHz |
| 24L | 1MX8 M2 80 MHz |
| 24M | Blank Address Buffer Zero (0) (BAB0) |
| 24N | Blank Address Buffer One (1) (BAB1) |
| 24O | Blank Address Buffer Two (2) (BAB2) |
| 26A | Programmable Array Logic (PAL) Memory Select M0 |
| 26B | Programmable Array Logic (PAL) Memory Select M1 |
| 26C | Programmable Array Logic (PAL) Memory Select M2 |
| 26D | Programmable Array Logic (PAL) Memory Sequencer |
| 28 | RGB D/A 80 MHz |
| 30A | Programmable Array Logic (PAL) HORZ SYNC TIME CONTROL |
| 30B | Programmable Array Logic (PAL) VERT SYNC TIME CONTROL |
| 30C | Programmable Array Logic (PAL) HORZ COUNT CONTROL |
| 30D | Programmable Array Logic (PAL) VERT COUNT CONTROL |
| 30E | Programmable Array Logic COMP CONTROL |
| 32A | 80 MHz Clock |
| 32B | I/O Output 80 MHz Clock Driver |
| 32C | I/O Output 40 MHz Clock Driver |
| 34A | DC to DC Converter |
| 34B | VME Bus |

Figure 2A:
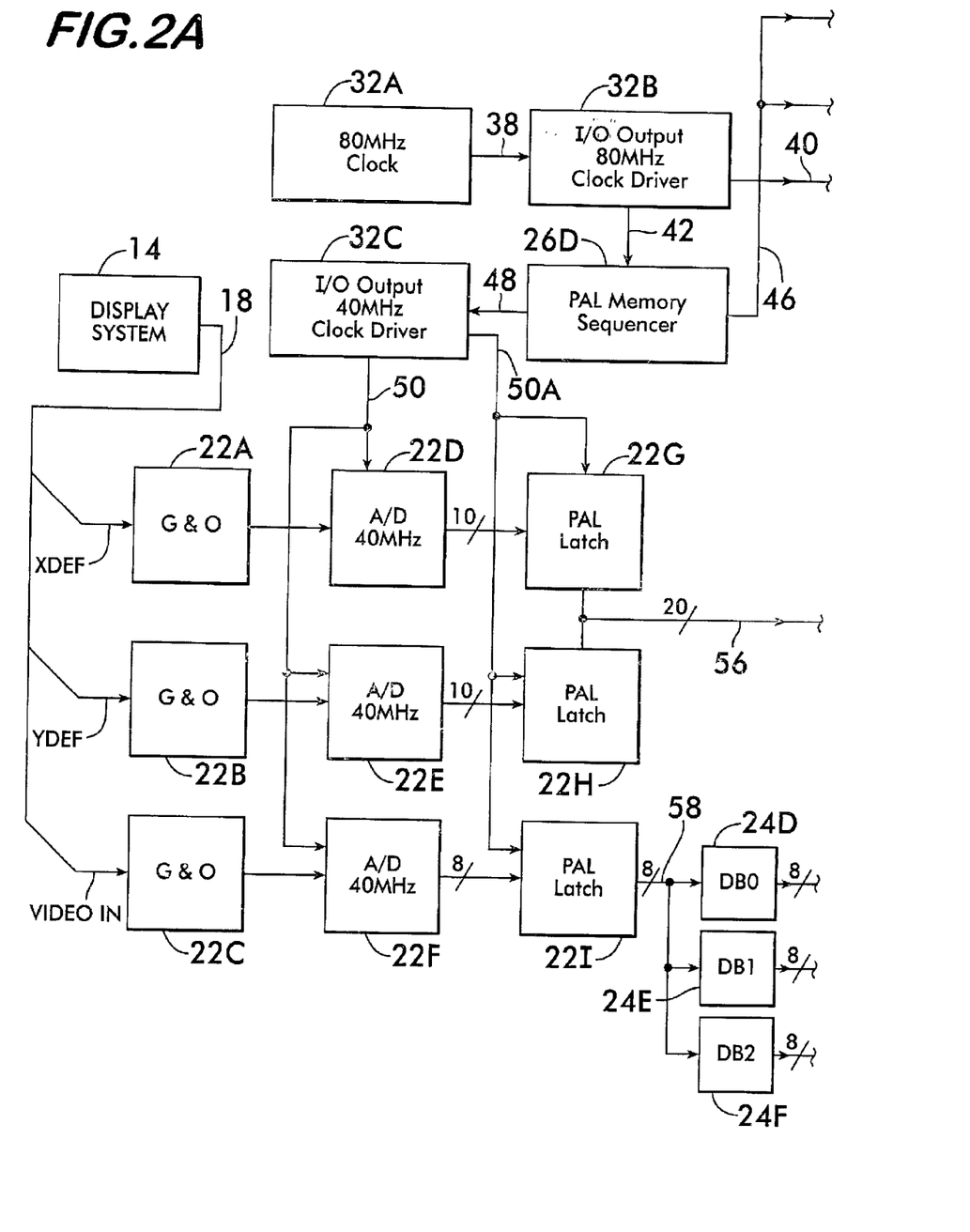
FIG. 2 is composed of FIGS. 2(A), 2(B) and 2(C) that cumulatively illustrate a block diagram of the video converter board of the present invention.
Figure 2B:
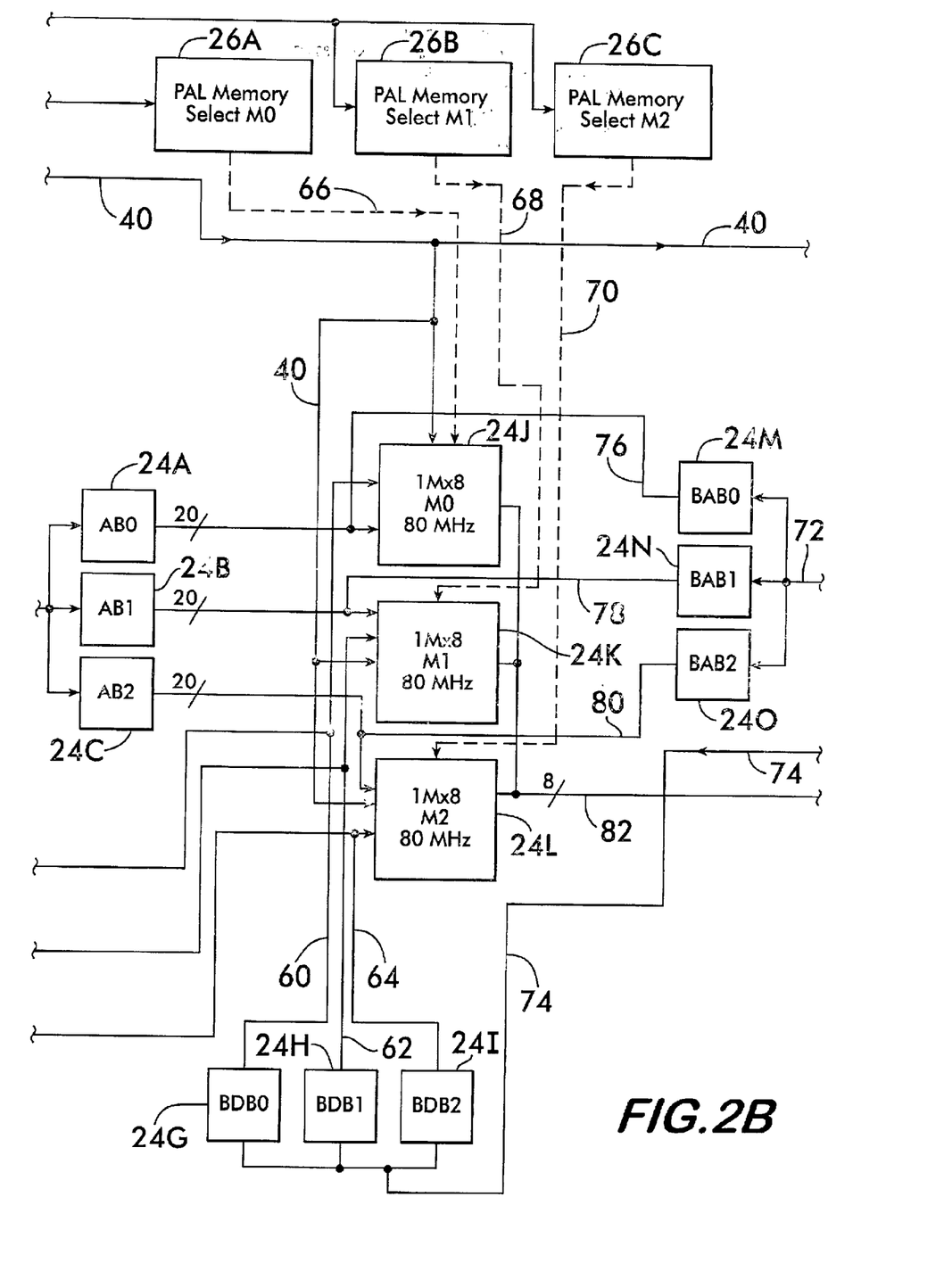
Figure 2C:
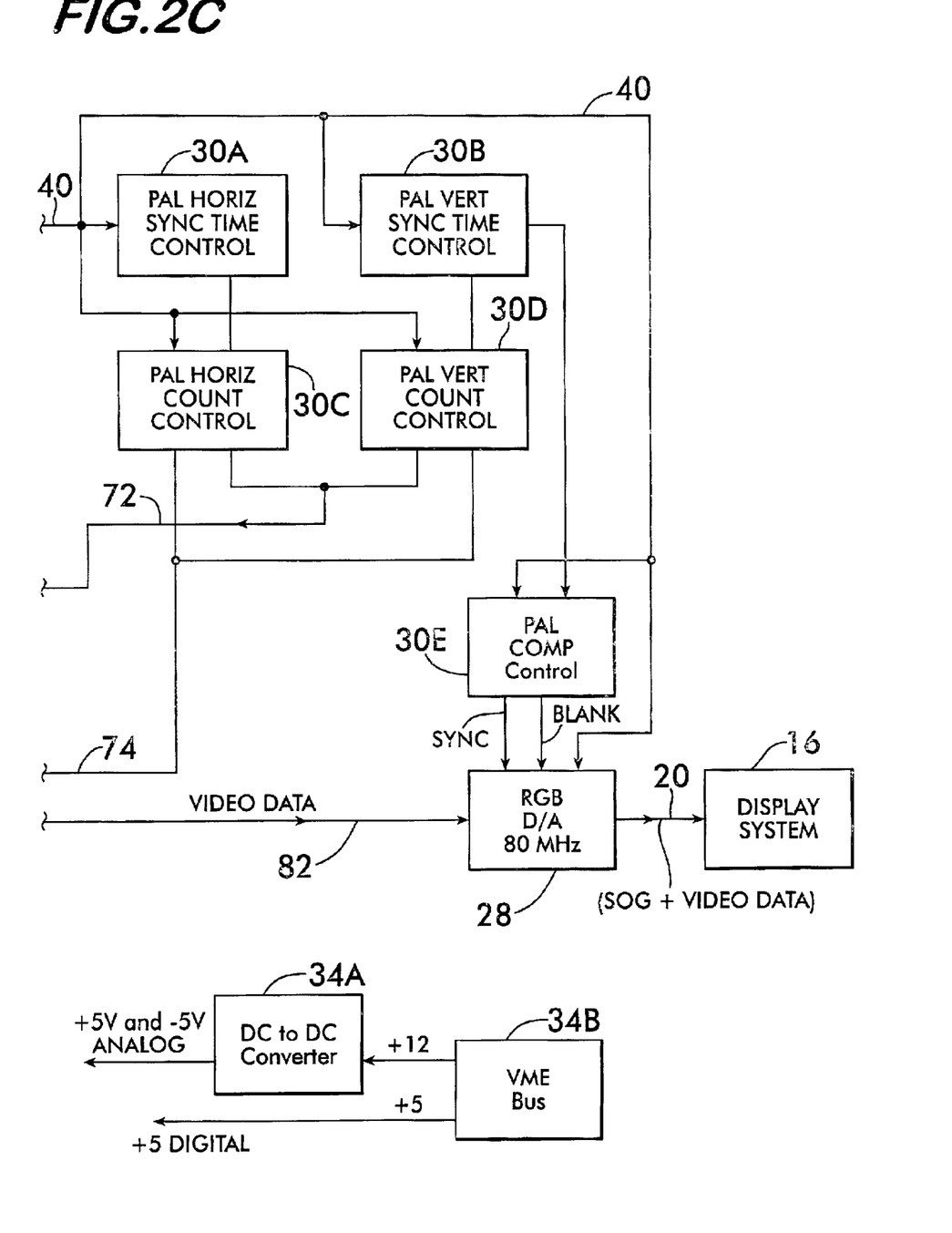

In general, and with simultaneous reference to FIGS. 2(A), 2(B) and 2(C), the A/D front-end circuitry 22 receive the X deflection (XDEF), Y deflection (YDEF) signals, and the Video-In signals all of which are present on signal path 18. The analog-to-digital front-end circuitry 22 samples, at a predetermined rate, the X deflection, Y deflection and Video In signals and converts each sample signal into a corresponding digital quantity that is delivered to the memory 24 comprised of a plurality of banks 24J, 24K, and 24L. Memory control circuitry 26 sequentially selects each of the plurality of banks 24J, 24K, and 24L.

The elements 24A, 24B, and 24C, shown in FIG. 2(B), serve as buffers that provide address information generated by A/D elements 22D and 22E and for writing to memory banks 24J, 24K, and 24L. The element 22F, shown in FIG. 2(A), is the A/D converter that serves the video-in data. The elements 24D, 24E, and 24F serve as buffers that provide video data info generated by A/D element 22F and are used for the actual video data written to memory banks 24J, 24K, and 24L, shown in FIG. 2(B). The elements 24G, 24H, and 24I serve as data buffers that provide blank data for memory blanking purposes to be described hereinafter.

The synchronization control circuitry 30 has a first routine for generating timing for the sync-on-green (SOG) signal and a second routine for generating the memory addresses for reading and blanking the selected memory so as to present data to the digital to analog converter output circuitry 28 and clearing memory 24 for a next cycle, respectively. The first and second routines are to be further described hereinafter with reference to FIG. 3.

The converter D/A output circuitry 28, shown in FIG. 2(C), receives the RGB video formatted data from memory 24 and responds to the synchronization control circuitry 30, and generates the SOG signal along with the RGB vide on signal path 20 and in a manner conforming to the serial interface requirements of the display system 16.

The power subsystem 34 comprises a conventional DC to DC converter 34A that receives +12 volt input from the VME Bus 34B. The VME Bus 34B also supplies the +5 volt excitation for the digital circuitry shown in FIG. 2(C). The DC to DC converter generates the +5V and −5V excitation also used or the analog circuitry shown in FIG. 2.

The timing and control subsystem 32, shown in FIG. 2(A), comprises the element 32A which generates 80 MHz clock that is routed to element 32B by way of signal path 38. The element 32B which is a clock driver delivers a 80 MHz clock that is supplied on signal path 40 to element 30A, as well as to the elements 24J, 24K, 24L, (see FIG. 2(B)), 30B, 30C, 30D, and 28 (see FIG. 2(C)). The element 32B of FIG. 2(A) also delivers the 80 MHz clock that is applied to element 26D by way of signal path 42. Element 26D divides the 80 MHz signal to 40 MHz and delivers such to element 32C. Element 32C is a clock driver that drives elements 22D, 22E, 22F, 22G, 22H, and 22I. The element 26D, in response to its received signal on signal path 42, generates the timing signals to elements 26A, 26B, and 26C, shown in FIG. 2(B), by way of signal path 46.

The elements 22A, 22B, 22C, shown in FIG. 2(A), receive the XDEF, YDEF, and video-in signals on signal path 18 and each of these elements 22A, 22B, and 22C has the provisions for adjusting their gain and offset parameters respectively. The gain and offset parameters, known in the art, are used to adjust for slight variations in the stroke/raster video signals (XDEF, YDEF, and Video-in). The output of elements 22A, 22B, an 22C are respectively routed to elements 22D, 22E, and 22F each of which is an A/D converter operated at 40 MHz sampling rate.

The elements 22D and 22E each provide a 10-bit digital quantity that are respectively routed to elements 22G and 22H, whereas element 22F provides an 8-bit digital quantity that is routed to element 22I. The output of elements 22G and 22H are combined together so as to provide a 20-bit quantity, serving as a memory address, that is respectively routed, via signal path 56, to elements 24A, 24B, and 24C, shown in FIG. 2(B), whereas element 22I provides a 8-bit quantity, serving as video data that is routed, via signal path 58 to elements 24D, 24E, and 24F, shown in FIG. 2(A).

The elements 24A, 24B, and 24C, shown in FIG. 2(B), respectively route their 20-bit output information to inputs of elements 24J, 24K, and 24L, serving as selectable memory banks. Similarly, elements 24D, 24E, and 24F, shown in FIG. 2(A), respectively route their 8-bit quantity to the respective inputs of elements 24J, 24K, and 24L, shown in FIG. 2(B).

The elements 24G, 24H, and 24I have their inputs tied to ground and are respectively routed to respective inputs of elements 24J, 24K, and 24L, by way of signal paths 60, 62, and 64 respectively. These elements 24G, 24H, and 24I serve as buffers that generate "blank data" in a manner as to be described hereinafter.

The elements 24J, 24K, and 24L each serve as a memory bank each having a typical capacity of about 1 Mega (M) byte and are respectively selected by elements 26A, 263, and 26C respectively by way of signal paths 66, 68, and 70 respectively. The memory banks 24J, 24K, and 24L, are responsive to the synchronization control circuit 26D and of elements 30C, 30D, and for read and blank addressing shown in FIG. 2(C). The element 26D, shown in FIG. 2(A), (memory control sequencer) controls the selection of the memory banks 24J, 24K and 24L, shown in FIG. 2(B), whereas elements 30C and 30D, shown in FIG. 2(C), provide addressing lines for reading and blanking purposes.

The synchronization control circuit 30 has a first routine (to be described with reference to FIG. 3) of generating timing for the sync-on-green (SOG) signal using elements 30A and 30B, shown in FIG. 2(C), and a second routine (to be described with reference to FIG. 3) for generating the memory addresses for reading and blanking the selected memory bank 24J, 24K, or 24L, shown in FIG. 2(B), using elements 30C and 30D, shown in FIG. 2(C). More particularly, elements 30A and 30B control the generation of the SOG signals and elements 30C and 30D control the memory addresses for reading and blanking. The synchronization control circuitry 30 generates the memory addresses to be read from the memory banks 24J, 24K, and 24L, shown in FIG. 2(B), on signal path 72 and the command for generating the blank data on the memory data bus on signal path 74, both of which paths are further shown in FIGS. 2(B) and 2(C).

The memory address reading path 72 of FIG. 2(C) is routed to elements 24M, 24N, and 24O of FIG. 2(B) which respectively, in turn, respond by supplying corresponding signals 76, 78, and 80, respectively carried three separate buses which, in turn, are routed to elements 24J, 24K, and 24L. Each of the elements, 24J, 24K, and 24L provides output signals which is representative of read data on signal path 82 representative of video data which, in turn, is routed to the D/A output circuitry 28 shown on FIG. 2(C).

The first and second routines for respectively generating the timing for sync-on-green (SOG) and generating the memory addresses for reading and blanking are interrelated and are primarily implemented by means of PAL devices. The PAL devices shown in the block diagram of FIG. 2 are Programmable Array Logic devices known in the art. These devices are designed using software and then programmed to provide logic circuits and state machines. The present invention utilizes these devices to generate the logic, timing, forming of addresses and control signals, and to perform certain features thereof.

For example, the video converter board (VCB) 10 generates a resolution of 1280 pixels by 1024 lines on the monitor 16. To keep consistent with the display system 14 that generates the stroke/raster video, the present invention does not use 256 pixels on each line, but rather generates a "square" image resolution of 1024 by 1024. Therefore to generate 1024 locations across the screen of the monitor 16 and 1024 locations down the screen of the monitor 16, the present invention uses a 10-bit horizontal address and a 10-bit vertical address ($2^{10}$=1024). Elements 22D and 22E generate the 20-bit address (10-bits for horizontal and 10-bits for vertical) for write data addressing. For reading and blanking, elements 30C and 30D generate these addresses. Since reading and blanking require the entire memory array 24J, 24K and 24L to be accessed, the present invention simply uses the PAL devices as counters that count from 0 to 1023 (total of 1024 addresses) for both horizontal and vertical addressing. Thus, the second routine for controlling the memory addressing and blanking is to simply design a counter to count at 80 MHz.

In operation, as the counters count, elements 30A and 30B monitor the counting. Element 30A is used for horizontal purposes and element 30B is used for the vertical purposes. As the data is being delivered to the monitor 16, at the end of each line there is a sync signal used to tell the monitor circuit to go back to the beginning of the next line. This signal is referred to as the horizontal sync signal 84 and is shown in FIG. 3(A).

Figure 3A:
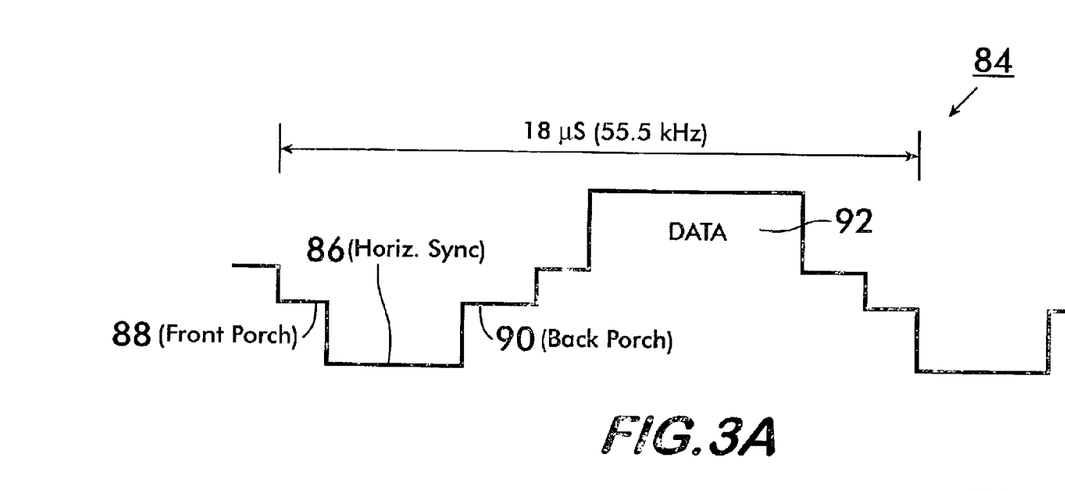
FIG. 3 is composed of FIGS. 3(A) and 3(B) that respectively illustrate details of the horizontal and vertical synchronization signals generated by the video converter board of FIG. 2.

FIG. 3(A) illustrates signal 84 as having a typical duration of 18 ms (55.5 kHz) and comprised of a horizontal (horiz) sync portion 86, a front porch portion 88, a back porch portion 90, and a portion 92 that carries DATA.

When the horizontal counter reaches 1023, the horizontal sync signal 84 is generated by element 30A. The front porch timing comprised of portion 88 is the amount of time it takes the phosphorus gun, such as that found in monitor 16 for the CRT thereof to shut off, the sync time comprised of portion 86 is the amount of time it takes the gun to travel back to the beginning of the next line, and the back porch timing comprised of portion 90 is the time it takes for the gun to come back on. The usage of these portions is standard for RGB operation.

Figure 3B:
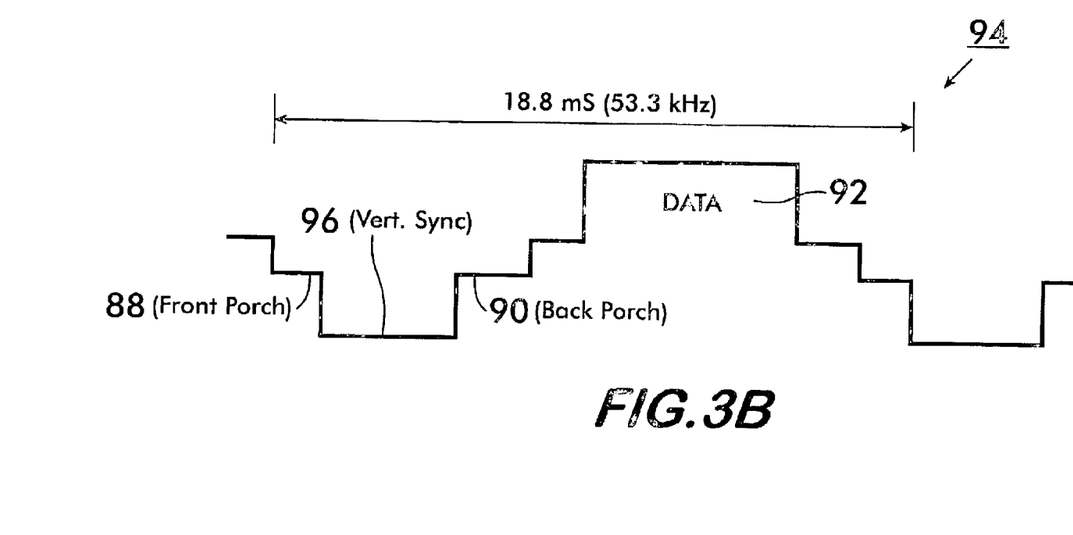

At the end of producing 1024 lines, element 30B detects that the counter has counted to 1023 and generates the timing for the vertical sync pulse 94 shown in FIG. 3(B) having a typical duration of 18.8 ms (53.3(Hz)). Again, this signal is comprised of a front porch 88 and a back porch 90 portions. However, signal 94 includes a vert sync portion 96 instead of horiz sync portion 86. This signal 94 is typically quite longer than that of the horizontal pulses because the gun has to travel from the bottom of the screen to the top of the screen. These signals 84 and 94 also give reason to the name "sync-on-green". The data 92 and the sync pulses of signals 84 and 94 all travel on the green signal, thus there is only one output of the VCB 10 delivered by D/A output circuitry 28, shown in FIG. 2(C).

The D/A output circuitry 28 provides for the generation of the SOG signal and the transmission of video data in its RGB format and generates these quantities onto the signal path 20 which requires an operation conforming to the requirements of a serial interface, e.g., RS-343A standard. The display system 16 includes a RGB monitor, (CRT) that should be continuously refreshed to allow its colored phosphorus to hold the glow thereof in a continuous manner. The refresh cycles provided by the video converter board 10 may be further described with reference to FIG. 4.

Figure 4:
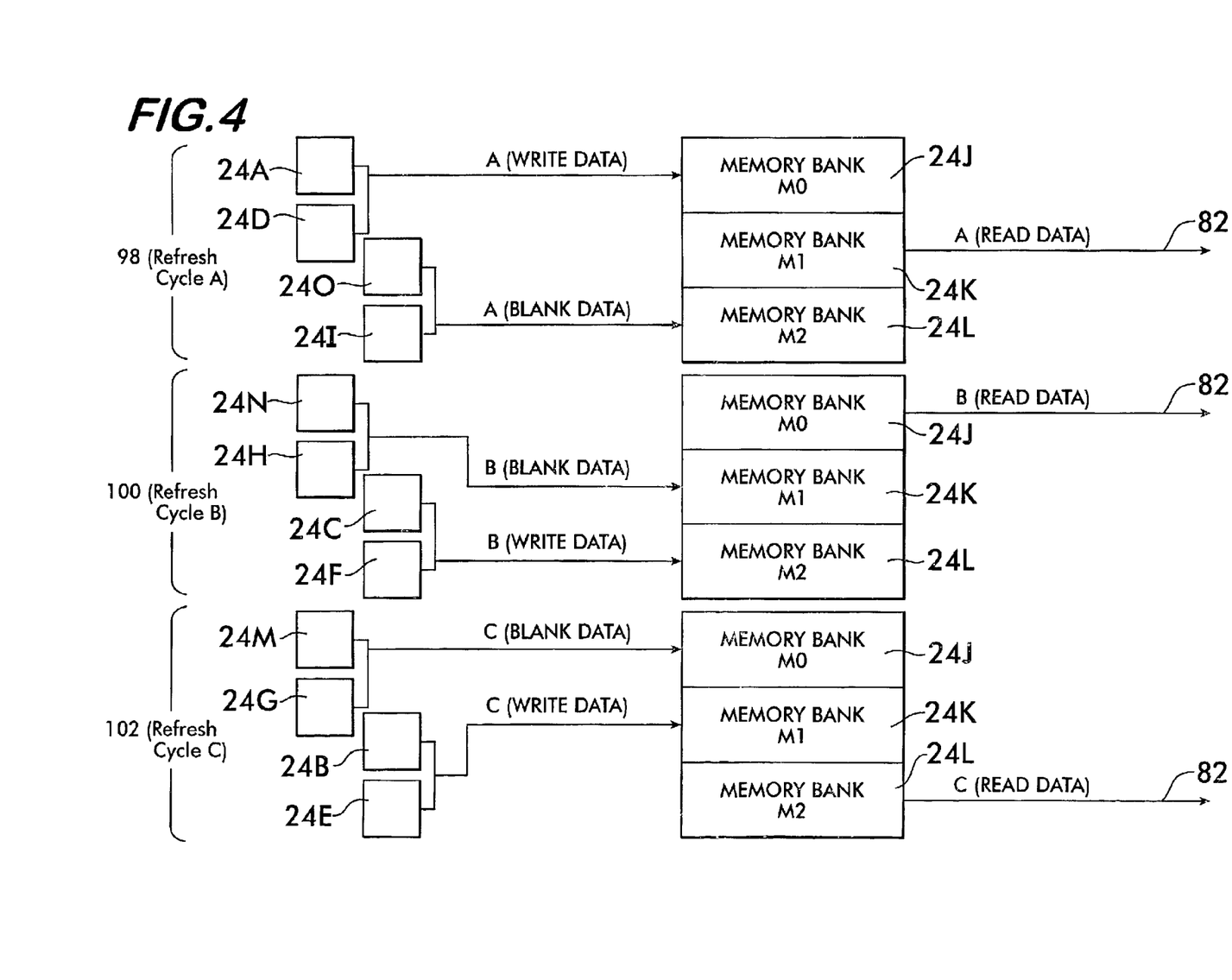
FIG. 4 illustrates the memory control sequences utilized for providing the refresh cycles generated by the video converter board of FIG. 2(B).

FIG. 4 illustrates memory banks 24J, 24K, and 24L and three operational states related to three refresh cycles 98 (refresh cycle A), 100 (refresh cycle B), and 102 (refresh cycle C). FIG. 4 further illustrates the refresh cycles A, B and C carrying the corresponding letters A, B, C for the functions WRITE DATA, BLANK DATA and READ DATA each connected to the elements of FIG. 2. The correlation between the functions WRITE DATA, BLANK DATA and READ DATA and the elements of FIG. 2, as well as the memory banks 24J, 24K and 24L of FIG. 2, is given in Table 2.

TABLE 2

| FUNCTION | ELEMENTS | | MEMORY BANKS |
|---|---|---|---|
| A (WRITE DATA) | 24A | 24D | 24J |
| A (BLANK DATA) | 24O | 24I | 24L |
| A (READ DATA) | 24N | 24K | 24K |
| B (BLANK DATA) | 24N | 24H | 24K |
| B (WRITE DATA) | 24C | 24F | 24L |
| B (READ DATA) | 24M | 24J | 24J |
| C (BLANK DATA) | 24M | 24G | 24J |

TABLE 2-continued

| FUNCTION | ELEMENTS | | MEMORY BANKS |
|---|---|---|---|
| C (WRITE DATA) | 24B | 24E | 24K |
| C (READ DATA) | 24O | 24L | 24L |

During one complete refresh cycle, that is, during refresh cycles 98, 100 or 102, each quantity sampled by the A/D converter is stored in a given memory bank 24J, 24K, or 24L and the information taken therefrom is placed on signal path 82. Also during each cycle, a memory bank is read from the previous memory bank written to, and a memory bank is "blanked," so that new data can be written into it on the next cycle. The term "blank" herein refers to writing all zeros to all memory locations in that particular memory bank.

During refresh cycle 98 the A (WRITE DATA) comprises an address generated by element 24A and data generated by element 24D. The A (BLANK DATA) is generated by elements 24O and 24I. The A (READ DATA) is taken from the address specified by element 24N and the data thereof is determined by element 24K.

During refresh cycle 100 the B (WRITE DATA) comprises an address generated by element 24C and data generated by element 24F. The B (BLANK DATA) is generated by elements 24N and 24H. The B (READ DATA) is taken from the address specified by element 24M and the data thereof determined by element 24J.

During refresh cycle 102 the C (WRITE DATA) comprises an address generated by element 24B and data generated by element 24E. The C (BLANK DATA) is generated by elements 24M and 24G. The C (READ DATA) is taken from the address specified by element 24O and the data thereof is determined by element 24L.

It should now be appreciated that the practice of the present invention provides for a video converter board that receives video data formatted in a stroke/raster video data and transforms the signal video data into the RGB format responsive to the SOG signal and delivers such information on to the serial path 20 connected to the display system 16. The video converter board 10 allows the same data to be displayed on a remote monitor.

The hereinbefore description of the video converter board 10 has been addressed for the adaptation to the serial interface formatted in accordance with the RS-343A standard.

What we claim is:

1. A video converter board for converting stroke/raster video formatted data into a Red, Green, Blue (RGB) video having a sync-on-green (SOG) control signal formatted for a serial interface conforming to Electronic Industries Association (EIA) standards, said stroke/raster video data comprising X deflection signals, Y deflection signals and video-in signals and said RGB video data being synchronized by said sync-on-green (SOG) signal, said video converter board comprising:

a) analog to digital front-end circuitry for sampling at a predetermined rate said X deflection, Y deflection and video-in signals and converting each sampled signal into a corresponding digital quantity;

b) video memory comprised of a plurality of banks for storing each digital quantity;

c) memory control circuitry for sequentially selecting each of the plurality of memory banks;

d) synchronization control circuitry having a first routine for generating timing signals for said sync-on-green (SOG) signal and a second routine for generating the memory addresses for reading and blanking; and e) a digital/analog converter output circuitry receiving in response to said synchronization control circuitry, the formatted RGB video data as well as the timing signals for said SOG signal and outputting said SOG signal along with said RGB video data in a manner conforming to said interface.

2. The video converter board according to claim 1, wherein said sampling rate is about 40 MHz.

3. The video converter board according to claim 1, wherein said digital front-end circuitry comprises a combiner for combining the X deflection and Y deflection digital quantities into a 20-bit digital quantity.

4. The video converter board according to claim 1, wherein said memory, said memory control circuitry, said synchronization control circuitry and said digital/analog converter output end circuitry are synchronized to an 80 MHz clock rate.

5. The video converter board according to claim 1, wherein said serial interface is formatted in accordance with a RS-343A standard.

6. The video converter board according to claim 1, wherein each memory bank has a capacity of about 1 Mega (M) byte.

* * * * *